(12) United States Patent
Bowers et al.

(10) Patent No.: US 8,389,624 B2
(45) Date of Patent: Mar. 5, 2013

(54) INTERMEDIATES FOR PREPARATION OF POLYMERIC COMPOSITIONS

(75) Inventors: Frank Bowers, Alicante (ES); Anna Thomé, Langwiesen (CH); Raphael Jaquet, Schaffhausen (CH); Jürgen Widler, Hilzingen (DE); Ralph Bergs, Hiltzingen (DE)

(73) Assignee: CJH Ventures LLC, Scottsdale, AZ (US)

( * ) Notice: Subject to any disclaimer, the term of this patent is extended or adjusted under 35 U.S.C. 154(b) by 136 days.

(21) Appl. No.: 12/311,793

(22) PCT Filed: Oct. 9, 2007

(86) PCT No.: PCT/GB2007/003819
§ 371 (c)(1),
(2), (4) Date: Apr. 13, 2009

(87) PCT Pub. No.: WO2008/043994
PCT Pub. Date: Apr. 17, 2008

(65) Prior Publication Data
US 2010/0036040 A1   Feb. 11, 2010

(30) Foreign Application Priority Data
Oct. 11, 2006   (GB) .................................. 0620091.9

(51) Int. Cl.
C08G 18/10 (2006.01)
C08G 18/16 (2006.01)
C08G 18/06 (2006.01)
C08G 18/48 (2006.01)

(52) U.S. Cl. ......... 524/590; 524/507; 524/589; 524/591; 524/839; 523/150; 523/200; 523/204; 521/137

(58) Field of Classification Search ................. 524/845, 524/589, 590, 591, 507, 839; 523/150, 200, 523/204; 521/137
See application file for complete search history.

(56) References Cited

U.S. PATENT DOCUMENTS

| | | | | |
|---|---|---|---|---|
| 4,225,683 A | * | 9/1980 | Timm et al. | 525/126 |
| 5,952,053 A | * | 9/1999 | Colby | 427/393 |
| 5,993,897 A | * | 11/1999 | Bowers et al. | 427/136 |
| 6,787,596 B1 | * | 9/2004 | Maier et al. | 524/507 |
| 7,414,092 B2 | * | 8/2008 | Steidl et al. | 524/591 |
| 7,825,210 B2 | * | 11/2010 | Steidl et al. | 528/71 |
| 2003/0088045 A1 | * | 5/2003 | Haberle et al. | 528/44 |
| 2005/0215701 A1 | * | 9/2005 | Porsch et al. | 524/589 |
| 2008/0269367 A1 | * | 10/2008 | Neill et al. | 521/137 |
| 2009/0318607 A1 | * | 12/2009 | Sch tte et al. | 524/507 |

FOREIGN PATENT DOCUMENTS

| | | | |
|---|---|---|---|
| DE | 19817507 | * | 10/1999 |
| DE | 19918459 A1 | * | 10/2000 |
| EP | 0714929 | * | 6/1996 |
| GB | 2246077 A | * | 1/1992 |
| GB | A-2337266 | * | 11/1999 |
| WO | WO 99/31173 | * | 6/1999 |

* cited by examiner

*Primary Examiner* — Mark Eashoo
*Assistant Examiner* — Michael A Salvitti
(74) *Attorney, Agent, or Firm* — The Noblitt Group, PLLC

(57) ABSTRACT

A stable liquid intermediate comprising a polyol, and/or an acid and/or a catalyst and/or water for the preparation of polymeric compositions, the polyol being polyester polyol, a polyoxpropylene-polyoxypropylene polyol or a mixture thereof. There is disclosed a method of use of said stable liquid intermediate wherein said stable liquid intermediate is mixed with rubber granules.

18 Claims, 8 Drawing Sheets

Extrapolation is for illustration only

Figure 3

Physicals after 7 days

| | # | UTS MPa. | elongation to break % |
|---|---|---|---|
| See below: | 1 | 0.553 | 62.8 |
| | 2 | 0.623 | 65.2 |
| | 3 | 0.547 | 57.4 |
| mean | | 0.574 | 61.8 |

| | # | UTS MPa. | elongation to break % |
|---|---|---|---|
| | 1 | 0.290 | 30 |
| 14% binder | 2 | 0.323 | 33.4 |
| | 3 | 0.315 | 27.3 |
| mean | | 0.310 | 30.2 |

| | # | UTS MPa. | elongation to break % |
|---|---|---|---|
| | 1 | 0.404 | 35 |
| 16% binder | 2 | 0.363 | 28.2 |
| | 3 | 0.415 | 31.4 |
| mean | | 0.394 | 31.5 |

| | # | UTS MPa. | elongation to break % |
|---|---|---|---|
| | 1 | 0.476 | 35 |
| 18% binder | 2 | 0.476 | 37.2 |
| | 3 | 0.435 | 26.7 |
| mean | | 0.462 | 33 |

*Invention sample comprises: 2% Liquid Intermediate + 12% binder*

Deformation Coefficient = 100 x (% deformation)/UTS

*Extrapolation is for illustration only*

Figure 7

Preferred range of % (by weight) of the constituents of the Stable Liquid Intermediate – with examples

|   | Water | Acid | Catalyst | Polyol | Example |
|---|---|---|---|---|---|
| 1 | 10<75% | 5<15% | 0.1<5 | Make up to 100% | 10 % Phosporic acid (85 %), 50% water, 1% Dibutyl tin dilaurate 39 % Polyetherpolyol |
| 2 | 10<75% | 5<15% |  | Make up to 100% | 48.75 % Polyetherpolyol, 50 % water, 1.25 % Dibutyl tin mercaptide |
| 3 | 10<75% |  |  | Make up to 100% | 50 % Polyetherpolyol, 50 % water |
| 4 |  | 5<15% | 0.1<5 | Make up to 100% | 88.85 % Polyetherpolyol, 10 % Phosporic acid (85 %), 1.25 % Dibutyl tin mercaptide |
| 5 |  | 5<15% |  | Make up to 100% | 90 % Polyetherpolyol, 10 % Sulfuric acid, |
| 6 | 10<75% |  | 0.1<5 |  | 48.75 % Polyetherpolyol, 1.25% Dibutyl tin mercaptide. 50% water |

Preferred species/description of constituents:

Acid: May be organic or inorganic acid, preferably a $P$- or S-containing acid and more preferably phosphoric acid; phosphorous acid; sulphuric acid; an ester or mixtures thereof.

Polyol: Polyester polyol, a polyoxypropylene- or polyoxypropylene-polyoxyethelene polyol or a mixture thereof.

Comprise a polyether polyol or a polyester polyol with a molecular weight from 100 to 9.000, preferably from 1.000 to 6.000, more preferably from 1.500 to 5.000 and especially from 2.000 to 4.000 g/Mol.

Catalyst: Tin catalysts, Amines catalysts etc.

Figure 8

Preferred range of % (by weight) of the constituents of the Stable Granulate Intermediate. — with examples.

|   | Particulate material | Binder | Example |
|---|---|---|---|
| 1 | Make up to 100% | 0.5 – 5% | 2% Stable Liquid Intermediate. 98% Rubber Granules. |
| 2 | Make up to 100% | 0.5 – 5% | 1% Stable Liquid Intermediate. 99% Binder. |

| Rubber Granules: | Rubber granules based on butatiene-rubber (BR), styrene butatiene-rubber (SBR), isoprene-rubber (IR), styrene-isoprenbutatiene-rubber (SIBR), acrylonitrilbutadiene-rubber (NBR), chloroprene-rubber (CR), isobutene-isoprene-rubber (IIR), ethylene-propylene-diene-monomer-rubber (EPDM) and natural rubber (NR), vulcanized thermoplastic (TPV) or mixtures thereof, and preferably a recycling material. Granule |
|---|---|
| Rubber Granule size range: | 0.1mm to 100mm |
| Non-elastomeric Granules: | Pea-gravel; stone; recycled glass |
| Non-elastomeric Granules size range: | 0.1mm to 10mm |

INTERMEDIATES FOR PREPARATION OF POLYMERIC COMPOSITIONS

CROSS REFERENCE TO RELATED APPLICATIONS

The present application is a National Stage Application claiming the priority of co-pending PCT Application No. PCT/GB2007/003819 filed Oct.9, 2007, which in turn, claims priority from Great Britain application Serial No.0620091.9 filed Oct. 11, 2006. Applicants claim the benefits of 35 U.S.C.§120 as to the PCT application and priority under 35 U.S.C.§119 as to the said Great Britain application,and the entire disclosures Of both applications are incorporated herein by reference in their entireties.

This invention concerns a method and materials for the production of a Stable Liquid Intermediate used in the production of improved porous polymeric compositions, particularly, though by no means exclusively, suitable for use in the formation of impact absorbing surfaces for sports or children's play areas, safety tiles, compliant substrates for recreational surfaces and resin bonded stone.

Known such impact absorbing surfaces comprise of particles of natural or synthetic rubber, such as styrene butatienerubber (SBR), and ethylene-propylene-diene-monomer-rubber (EPDM)\ for example, adhered together by polyurethane based moisture curing pre-polymer ("binder"). The moisture curing pre-polymer is in such quantity as to coat the surfaces of the particles to cause them to adhere leaving the interstices between the granules void to enable the uncured pre-polymer to come into contact with airborne water.

The composition may be laid to form a sports or play surface or to form a substrate to another surface such as that provided by synthetic turf for example.

The compositions are prepared on site immediately before installation by accurately metering out the granules, liquid pre-polymer and, if necessary, thoroughly mixing them prior to laying.

BRIEF DESCRIPTION OF THE DRAWINGS:

FIG. 3 shows UTS and elongation to break after 7 days.

Figure 1:
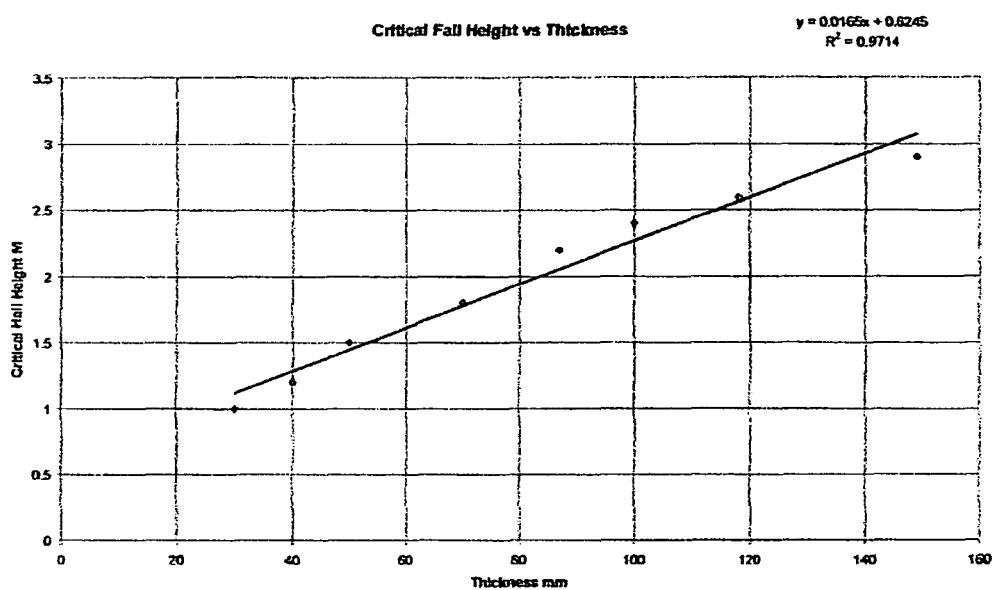
FIG. 1 is a plot of Critical Fall Height vs. Thickness.

A critical characteristic of impact absorbing safety surfaces is that they have to deform when subjected to an impacting force. The amount of deformation depends on the surface thickness and the compression modulus of the material. However, the safety surfaces must be of such a thickness that the elastic compression limit is not exceeded. See FIG. 1

Figure 2:
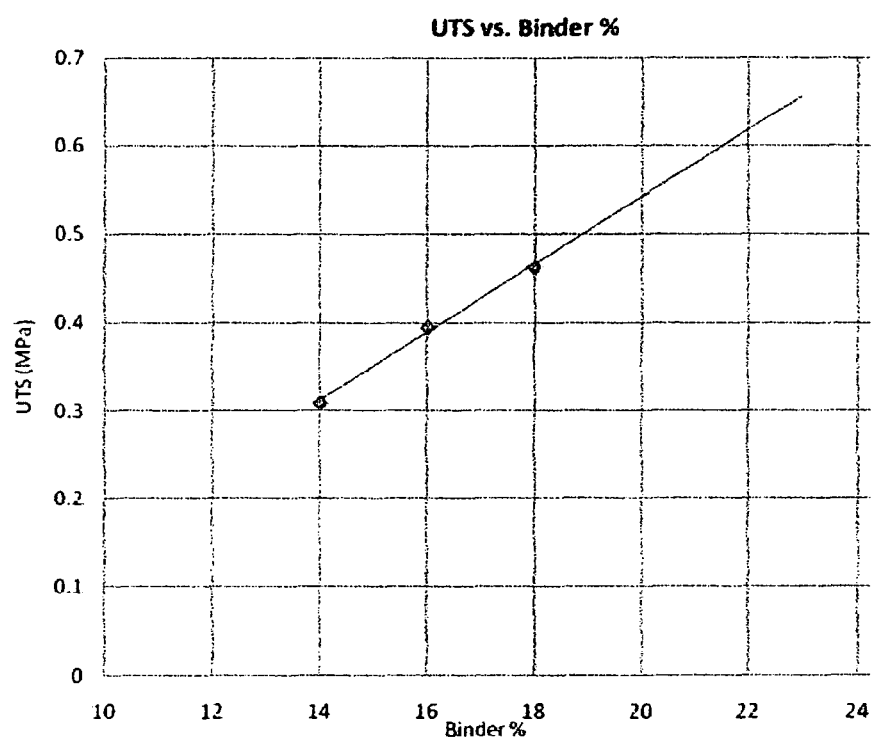
FIG. 2 is a plot of UTS vs. Binder percentage.

Another critical characteristic of safety surfaces is that they must be strong enough to withstand every-day wear and tear and the overall stress associated with shrinkage. The strength of polymeric compositions is proportional to binder concentration—see FIG. 2. However, increasing binder concentration also increases stiffness which diminishes the compositions impact attenuation properties. In practical terms this means that the polyurethane concentration—for the wearing course at least—is 15%-20%.

It is the object of the present invention to provide methods and materials for the production of a Stable Liquid Intermediate used to produce porous polymeric composites that mitigates against the aforementioned disadvantages. This is accomplished by modifying the mechanics of polymerization to produce inherently stronger and more impact absorbing compositions that were hitherto possible.

According to a preferred aspect of the invention there is provided a material and method for producing improved porous polymeric compositions comprising of the following:

Forming a Stable Liquid Intermediate comprising of polyol and/or water and/or acid and/or catalyst for the preparation of improved polymeric compositions by substantially modifying the mechanics of curing.

The polyol of the Stable Liquid Intermediate may be polyester polyol, a polyoxypropylene- or polyoxypropylene-polyoxyethelene polyol or a mixture thereof.

The polyol of the Stable Liquid Intermediate may comprise a polyether polyol or a polyester polyol with a molecular weight from 100 to 9,000,preferably from 1,000 to 6,000, more preferably from 1,500 to 5,000 and especially from 2,000 to 4,000g/Mol.

The polyol of the Stable Liquid Intermediate may have a functionality from 2 to 5 and preferably from 2 to 3.

The acid of the Stable Liquid Intermediate may be organic or inorganic acid, preferably a P- or S-containing acid and more preferably phosphoric add; phosphorous acid; sulphuric acid; an ester or mixtures thereof.

Stable Liquid Intermediate may be a reaction product of the polyol and the acid.

Stable Liquid Intermediate may be produced by reacting the polyol with 1.0% to 40.0% by weight preferably 3.0% to 20.0% by weight with the acid component at temperatures between 10.0° C. and 40.0° C. and more preferably at ambient temperatures.

Stable Liquid Intermediate may be a solution of at least one acid ester; a polyol and water.

Stable Liquid Intermediate may contain catalyst and/or additives such as a pigment.

Stable Liquid Intermediate is mixed with particulate material preferably at temperatures between 10.0° C. and 50.0° C. and more preferably at ambient temperatures to form a Stable Granulate Intermediate.

The invention will be further apparent from the following description, reference being made to FIG. 7, which concerns, by way of example only, the formation of a Stable Liquid Intermediate and its employment in the process of manufacturing an improved polymeric composition used in the installation of a recreational surface in accordance with one method thereof.

A Stable Liquid Intermediate is formed by mixing phosphoric acid and polyether based polyol—see # 5 of FIG. 7.

A Stable Granulate Intermediate is formed by mixing Stable Liquid Intermediate (2% by weight) with rubber granules size 1-4 mm (98% by weight)—FIG. 8#1.

The Stable Granulate Intermediate (88% by weight) is mixed with moisture curing polyurethane based pre-polymer (12% by weight) to form an uncured non-coherent mass. In general, the concentration of the binder in the uncured non-coherent mass is 5<20% (by weight).

The uncured non-coherent mass is applied to a stable sub-base and allowed to cure.

Again by way of example, a Stable Liquid Intermediate is formed by mixing phosphoric acid water and polyether based polyol—#4 FIG. 7.

A Stable Granulate Intermediate is formed by mixing Stable Liquid Intermediate with rubber granules size 1-4 mm—#1 FIG. 8.

The Stable Granulate Intermediate (95% by weight) is mixed with moisture curing polyurethane based prepolymer (5% by weight). In general, the concentration of the binder in the uncured non-coherent mass is 2<10% (by weight).

An appropriate quantity of the mixture is transferred to a tile press.

Heat and pressure is applied to the mixture to cause partial curing.

The tile so formed is de-moulded and allow to fully cure.

Again by way of example, Stable Liquid Intermediate (2%) is mixed with rubber granules (12%) at a manufacturing location to form Stable Granulate Intermediate.

Stable Granulate Intermediate is transported to site and mixed with a moisture curing polyurethane based pre-polymer to form an uncured non-coherent mass.

The uncured non-coherent mass is applied to a stable sub-base and allowed to cure.

In order to explain the uniqueness of the invention experimental results will be hereinafter reported.

Test files comprising of Stable Liquid Intermediate (2%) and moisture curing pre-polymer (12%)—#5 FIG. 7 were fabricated as herein described and compared with tiles comprising of the identical moisture curing pre-polymer at 14%; 16% and 18% binder concentration. The tiles were allowed to cure for seven days. Thereafter the determinations of Ultimate Tensile Strength and % Elongation to Break were performed on each sample. See FIG. 3.

Figure 4:
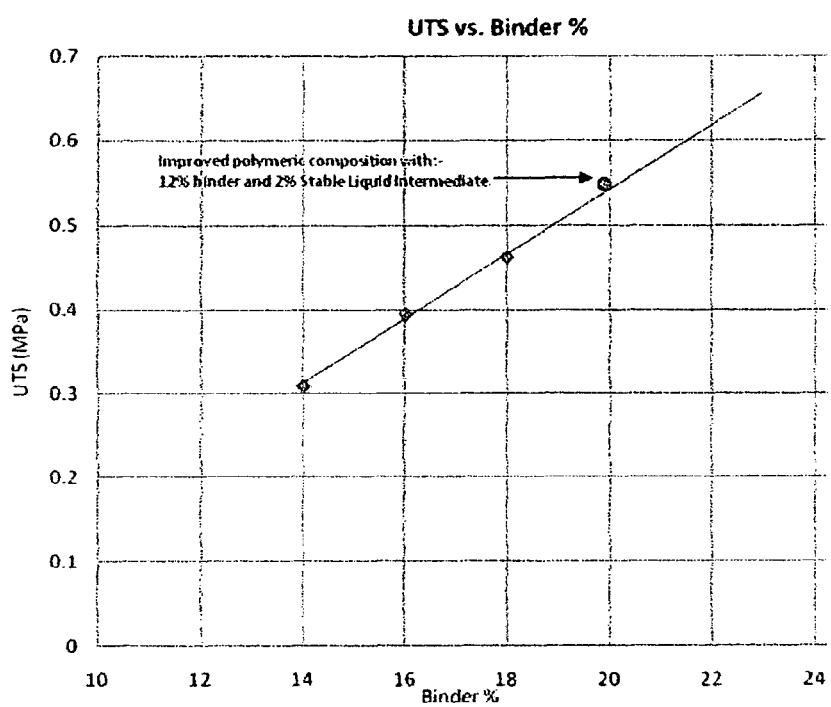
FIG. 4 is a plot of UTS vs. Binder percentage showing an improved polymeric composition with 12% binder and 2% Stable Liquid Intermediate.
Figure 5:
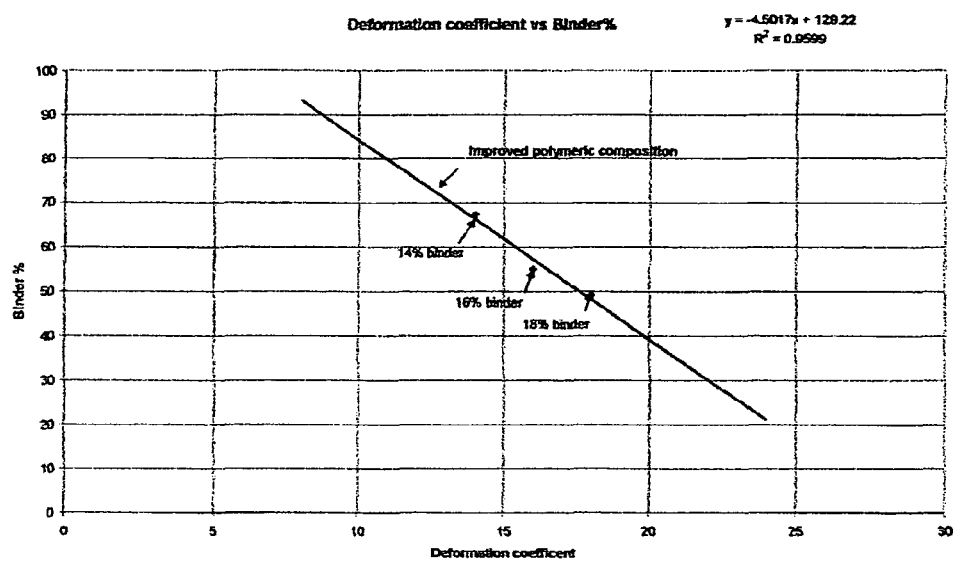
FIG. 5 is a plot of the Deformation coefficient vs. Binder percentage.

FIG. 4 shows that tiles comprising of Stable Liquid Intermediate (2%) and moisture curing pre-polymer (12%) had a tensile strength equivalent to a conventional tile comprising of rubber granules bound together with >20% binder. Moreover, the Deformation Coefficient (% Elongation to Break/UTS) was almost double that of the conventional tile of similar tensile strength. See FIG. 5

Figure 6:
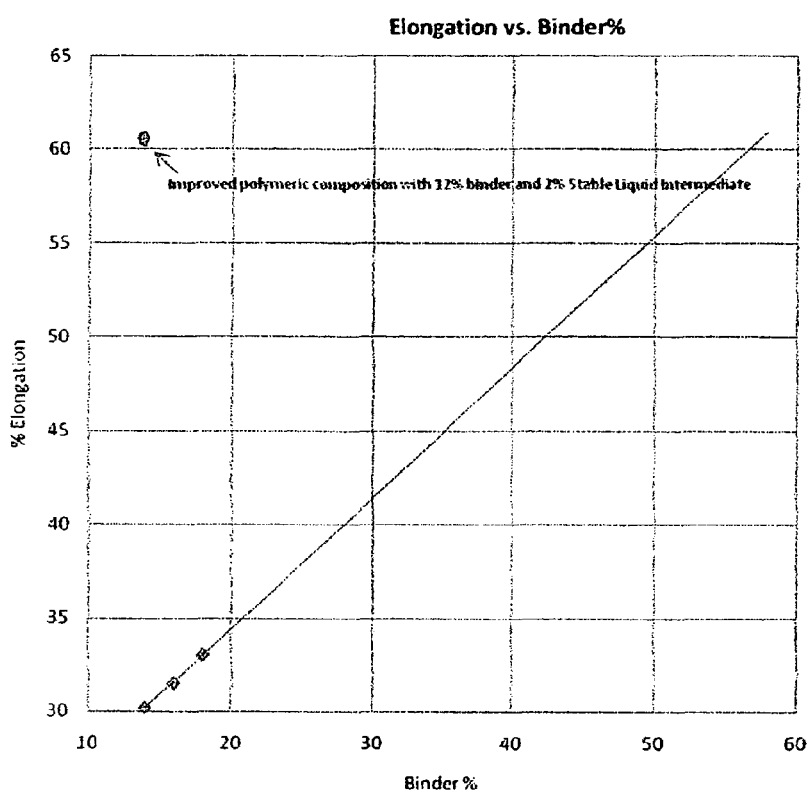
FIG. 6 is a plot of elongation vs. Binder percentage, showing an improved polymeric composition with 12% binder and 2% Stable Liquid Intermediate;
Table 7 shows the preferred percentages by weight of the constituents of the Stable Liquid Intermediate; and
Table 8 shows the preferred percentages by weight of the constituents of the Stable Granulate Intermediate.

It will be observed that the % Elongation to Break could not be achieved by a conventional porous polymeric composition. See FIG. 6

This means that porous polymeric safety surfaces and tiles incorporating the Stable Liquid Intermediate herein described will deform under impact considerably more than conventional porous composites, thus absorbing far more impact energy yet still be stronger than safety surfaces comprising of conventional polymeric porous compositions.

Moreover, material costs of porous polymeric compositions herein described are considerably less that those associated with conventional porous polymeric compositions of similar Ultimate Tensile Strength and achieve % Elongation to Break performance that is not achievable employing conventional porous polymeric technology.

It will be appreciated that it is not intended to limit the invention to the aforementioned examples only, many variations, such as might readily occur to one skilled in the art, being possible, without departing from the scope thereof as defined by the appended claims. FIG. 7 defines the possible permissible combinations of generic components of the Stable Liquid Intermediate.

TABLE 7

Preferred range of % (by weight) of the constituents of the Stable Liquid Intermediate - with examples

| | Water | Acid | Catalyst | Polyol | Example |
|---|---|---|---|---|---|
| 1 | 10 < 75% | 5 < 15% | 0.1 < 5 | Make up to 100% | 10% Phosporic acid (85%), 50% water 1% Dibutyl tin dilaurate 39% Polyetherpolyol |
| 2 | 10 < 75% | 5 < 15% | | Make up to 100% | 48.75% Polyetherpolyol, 50% water, 1.25% Dibutyl tin mercaptide |
| 3 | 10 < 75% | | | Make up to 100% | 50% Polyetherpolyol, 50% water |
| 4 | | 5 < 15% | 0.1 < 5 | Make up to 100% | 88.85% Polytherpolyol, 10% Phosporic acid (85%), 1.25% Dibutyl tin mercaptide |
| 5 | | 5 < 15% | | Make up to 100% | 90% Polyetherpolyol, 10% Sulfuric acid, |
| 6 | 10 < 75% | | 0.1 < 5 | | 48.75% Polyetherpolyol, 1.25% Dibutyl tin mercaptide 50% water |

Preferred Species/Description of Constituents:

Acid: May be organic or inorganic acid, preferably a P- or S-containing acid and more preferably phosphoric acid; phosphorous add; sulphuric acid; an ester or mixtures thereof.

Polyol: Polyester polyol, a polyoxypropylene- or polyoxypropylene- polyoxyethelene polyol or a mixture thereof. Comprise a polyether polyol or a polyester polyol with a molecular weight from 100 to 9,000, preferably from 1,000 to 6,000, more preferably from 1,500 to 5,000 and especially from 2,000 to 4,000 g/Mol.

Catalyst: Tin catalysts, Amines catalysts etc.

TABLE 8

Preferred range of % (by weight) of the constituents of the Stable Granulate Intermediate. - with examples.

| | Particulate material | Binder | Example |
|---|---|---|---|
| 1 | Make up to 100% | 0.5-5% | 2% Stable Liquid Intermediate. 98% Rubber Granules. |
| 2 | Make up to 100% | 0.5-5% | 1% Stable Liquid Intermediate. 99% Binder. |

TABLE 8-continued

Preferred range of % (by weight) of the constituents of the Stable Granulate Intermediate. - with examples.

| Particulate material | Binder | Example |
|---|---|---|

Rubber Granules: Rubber granules based on butatiene-rubber (BR), styrene butatiene-rubber (SBR), isoprene-rubber (IR), styrene-isoprenbutatiene-rubber (SIBR), acrylonitrilbutadiene-rubber (NBR), chloroprene-rubber (CR), isobutene-isoprene-rubber (IIR), ethylene-propylene-diene-monomer-rubber (EPDM) and natural rubber (NR), vulcanized thermoplastic (TPV) or mixtures thereof, and preferably a recycling material. Granule Rubber Granule size range: 0.1 mm to 100 mm
Non-elastomeric Granules: Pea-gravel; stone; recycled glass
Non-elastomeric Granules size range: 0.1 mm to 10 mm

The invention claimed is:

1. A method for the preparation of an impact absorbing surface from a porous polymeric composition, comprising the steps of: (a) preparing a stable granulate intermediate by coating a quantity of particulate material selected from rubber granules and non-elastomeric particulate material, with from 1%-2% by weight of the composition of a stable liquid intermediate, said stable liquid intermediate selected from the group consisting of a polyol and a catalyst, and a polyol, a catalyst and water, (b) mixing the stable granulate intermediate of Step (a) with from 2% to 30% by weight of the composition of a moisture curing polyurethane based prepolymer to form an unset polymeric composition, (c) applying the unset polymeric composition to a substrate, and (d) curing the unset polymeric composition to form said impact absorbing surface,
wherein tiles comprising an impact absorbing surface prepared from said porous polymeric composition exhibit ultimate tensile strength values in excess of 0.5 MPa, and % elongation to break values greater than 57%.

2. Method according to claim 1 wherein said rubber granules are prepared from a material selected from the group consisting of butadiene-rubber (BR), styrene butadiene-rubber (SBR), isoprene-rubber (IR), styrene-isoprene-butadiene-rubber (SIBR), acrylonitrilbutadiene-rubber (NBR), chloroprene-rubber (CR), isobutene-isoprene-rubber (IIR), ethylene-propylene-diene-monomer-rubber (EPDM) and natural rubber (NR), vulcanized thermoplastic (TPV), and mixtures thereof.

3. Method according to claim 1 wherein said non-elastomeric particulate material is selected from pea-gravel and re-cycled glass granules.

4. Method according to claim 3 wherein the particulate material has a particle size of <0.5 mm to 200 mm.

5. Method according to claim 1 wherein said polyol is selected from a polyester polyol, a polyoxypropylene polyol, a polyoxypropylene-polyoxyethylene polyol, and mixtures thereof.

6. Method according to claim 5 wherein said polyol has a molecular weight of from 100 to 9000 g/mol.

7. Method according to claim 5 wherein said polyol has a molecular weight of from 1000 to 6000 g/mol.

8. Method according to claim 5 wherein said polyol has a molecular weight of from 1500 to 5000 g/mol.

9. Method according to claim 5 wherein said polyol has a molecular weight of from 2000 to 4000 g/mol.

10. Method according to claim 5 wherein said polyol has a functionality of from 2 to 5.

11. Method according to claim 5 wherein said polyol has a functionality of from 2 to 3.

12. Method according to claim 1 wherein impact absorbing surface is prepared by mixing said stable granulate intermediate with said moisture curing polyurethane based binder, and allowing the mixture to set.

13. Method according to claim 1 wherein the stable granulate intermediate is formed at a central location and shipped to site or formed on-site immediately prior to installation.

14. Method according to claim 1 wherein in step (c), the unset polymeric composition of step (b) is laid on a prepared sub-base and cures to a coherent mass that forms said impact absorbing surface, and said impact absorbing surface is prepared as a children's playground, a running track or a sports hall floor.

15. Method according to claim 12 wherein said impact absorbing surface is prepared as an under layer, interface layer or a base layer for artificial turf or floors, or is a moulded article or in combination with mineralic components is a stone-blended polymeric mortar floor.

16. An impact absorbing surface prepared from a porous polymeric composition, in accordance with the method of claim 1.

17. The impact absorbing surface of claim 16 wherein said impact absorbing surface is prepared as a children's playground, a running track or a sports hall floor.

18. The impact absorbing surface of claim 16 wherein said impact absorbing surface is prepared as an under layer, interface layer or a base layer for artificial turf or floors, or is a moulded article or in combination with mineralic components is a stone-blended polymeric mortar floor.

* * * * *